Dec. 25, 1934.  W. R. WILEY  1,985,333
BOLT
Filed Dec. 11, 1931   2 Sheets-Sheet 1
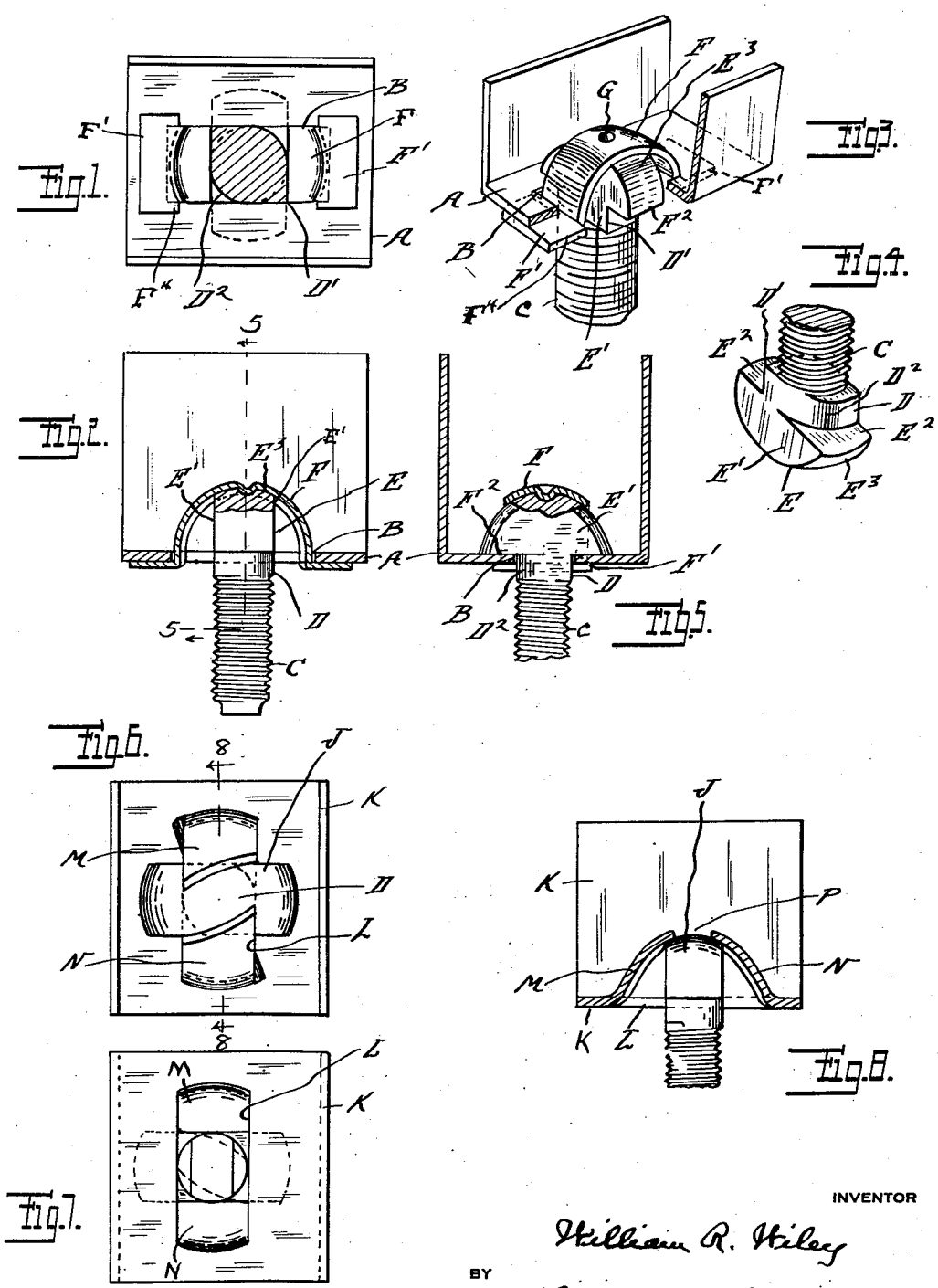
INVENTOR
William R. Wiley
BY
Evan Fry & Hardesty
ATTORNEYS Dec. 25, 1934.   W. R. WILEY   1,985,333
BOLT
Filed Dec. 11, 1931   2 Sheets-Sheet 2
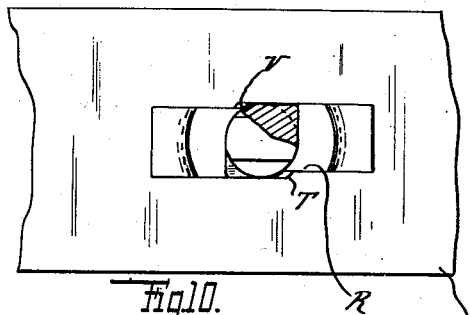
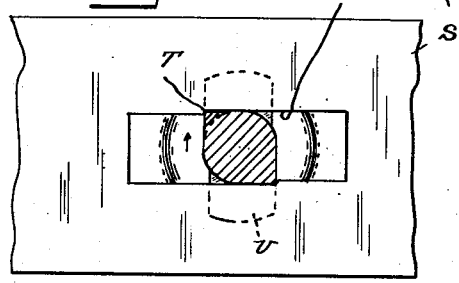
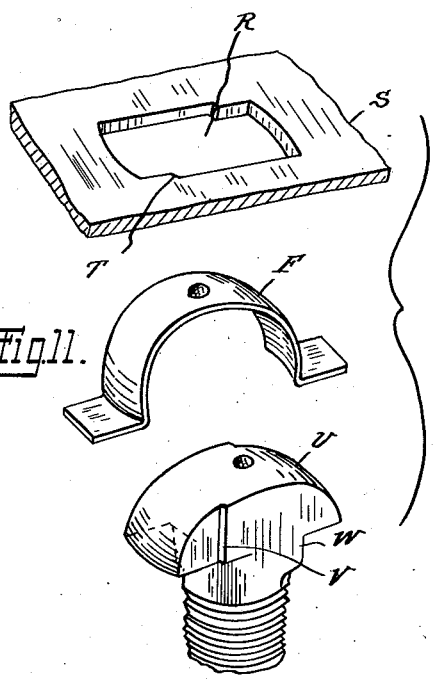
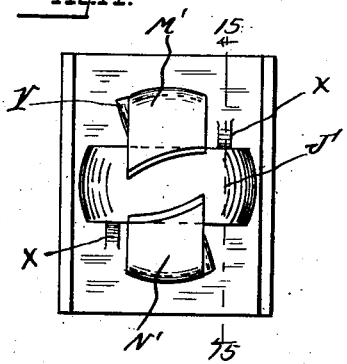
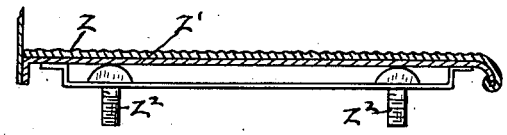
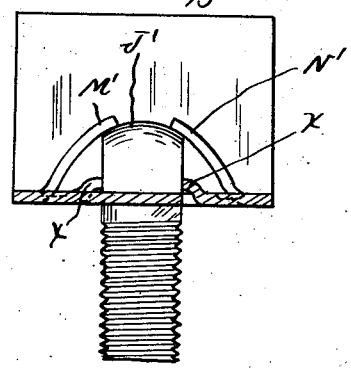
INVENTOR
William R. Wiley
BY
Swan Frye and Hardesty
ATTORNEYS

Patented Dec. 25, 1934

1,985,333

UNITED STATES PATENT OFFICE

1,985,333

BOLT

William R. Wiley, Detroit, Mich.

Application December 11, 1931, Serial No. 580,288

6 Claims. (Cl. 85—1)

This invention relates to means for effecting the positioning of bolts in an apertured wall, presumably metal, which is conveniently accessible from one side only, and from selected positions on which metal wall the threaded stem portions of the bolts are designed to project outwardly. The problem here dealt with has to do with the positioning of the bolts in these apertures in such a manner and by such means that whether the supporting metal wall be left immobile or be rattled or shaken, the bolts will not fall out from their located positions within the several apertures and thus become lost as regards accessibility and future utility.

In some instances such falling out of the bolts would at the most be merely annoying or represent the cost of a substituted bolt, but in other instances the presence of a lost bolt within the shell, from whose apertured wall the bolt is designed to project, would be a positive objection, one instance of which would be the case of a motor vehicle chassis, which is structurally built up by the correlation and association of interfitting channel bars, in such a way that there is a positively enclosed space within which such a lost bolt would objectionably rattle, thereby misleading a searching workman as to the source of the rattle, which, until adequately traced, might be unfairly charged against some misadjustment of the engine mechanism. To a lesser degree, though on the same principle, the presence of such a lost bolt within a boiler shell would be objectionable.

In contrast with the angular rocking of the generally L-shaped bolt about its positioned head as a center, with which my previously filed application for patent, Serial No. 575,261 deals, the present invention centers about the structural integration of the bolt and its supporting wall through the medium of axial rotation of the latter after its head has been inserted through a correspondingly shaped aperture in the supporting wall, to a degree sufficient to form an interlock, preferably through about a 90° angle; my invention also deals with the question of so limiting this described rotative movement of the bolt, so that in any one of several equivalent ways the rotation of the bolt is halted when the desired angular travel has been accomplished, so that the interlocking function will not be diminished to the point of inefficiency by its turning too far.

To the provision of a bolt structure and correlated parts which, when positioned in an apertured shell wall, are adequately interlocked and are proof against unintended displacement, this invention is directed. Preferred embodiments thereof are illustrated in the accompanying drawings, wherein:

Figure 1 is an elevational view of an apertured shell wall section, wherein a bolt and its cooperating clip are shown in vertical elevation and partly in section.

Figure 2 is a sectional elevational view of a bolt thus positioned relatively to a shell wall, being taken at right angles to the showing in Figure 1.

Figure 3 is a perspective of a section of channel bar with one of my improved bolt constructions positioned therein.

Figure 4 is a perspective of the head and the adjacent threaded stem portion of one of my bolts, designed to bring out the provision effected by its contouring against an undue degree of turning of the bolt in the manner hereinafter to be described.

Figure 5 is a largely sectional elevational view taken along the line 5—5 of Fig. 2 and looking in the direction of the arrows there shown.

Figure 6 is a plan view of a slightly modified form of bolt, viewed from the inside of the supporting wall.

Figure 7 is a view of the bolt shown in Figure 6, taken from a point outside of the supporting wall.

Figure 8 is a sectional elevational view of the modified construction shown in Figure 6, being taken along the line 8—8 thereof and looking in the direction of the arrows there shown.

Figure 9 is a vertical elevational view of a fragment of apertured shell wall, showing a bolt of the modified form shown in Figure 7 in position, being partly sectioned to bring out the peculiar variance in the cross-sectional contour of the neck or collar portion of the bolt.

Figure 10 is a similar view showing the bolt in finally seated position as contrasted with the initial positioning shown in Figure 9.

Figure 11 shows perspectively in spaced relation a section of apertured shell wall, the correlating resilient clip, and the bolt head. These are of the modified form shown in Figures 7, 9 and 10.

Figure 12 is a partly sectional elevational view of the parts shown in detached position in Figure 11, in assembled relation.

Figure 13 is a partly sectional elevation of a running board structure on a motor vehicle, showing how parts thereof may be made to serve cooperatively with the bolt elements herein characterized.

Figure 14 is an elevational view of a fragment of wall with suitable aperture, showing a still further modification of my improved construction with the bolt head shown in interlocking position thereon.

Figure 15 is a partly sectional elevational view taken along the line 15—15 of Figure 14 and looking in the direction of the arrows there shown.

Referring first to the form of construction illustrated in Figures 1 to 5 inclusive, A represents a metal wall such as would be constituted by one web or face of a channel bar, though obviously representative with equal fairness of any wall to which access is convenient or possible from one side only, as, for example, a boiler, but from which it is desired that bolts project so that their threaded stem portions may be structurally secured to initially separate elements; in the case of channel bars such as are used in the building of a motor vehicle chassis an illustration of an additional and to-be-attached-element would be the brackets which are designed to support the running board, mud guards, and the like. In such construction it is a matter of convenience and economy of factory assemblage that the similarly located bolt apertures B in each chassis unit be prepared and bolts positioned therein before the chassis frame is completed, and before its more or less rough or jolting handling, incident to its movement within the factory for the further structural assemblage of the motor vehicle frame, takes place.

Of course the complete structural assembly ultimately involves the screwing onto the threaded stem portion of the bolt of a nut or of the correspondingly threaded portion of a bracket or other additional structural element; but this would be insecurely held if the interlocking of the axially turned bolt head with the wall aperture has not been effectively accomplished. And the most effective interlock would of course be with the bolt head turned to a 90° angle from its originally inserted position; either less than this, or more, approaching a turn of 180°, would be correspondingly inefficient. This disclosure therefore has to do with accomplishing this desired result effectively, even under rapid assemblage conditions, through the medium of stops or obstacles, by means of which the further axial rotation of the bolt is halted at the 90° angular position desired, various forms thereof being here to be described.

This aperture B, it will be noted, is rectangularly oblong in shape, but as a matter of fact any form other than a truly round bolt head could be employed without departure from the spirit of my invention. The bolt itself, it will be noted particularly from Figures 2 to 5 inclusive, comprises the threaded stem portion C, collar D, and contoured head E, the latter being flat on two sides, as at E', though arched or curved over its center portion, as at E³; indeed except for the particular contouring of the collar D, which will be hereinafter referred to, such a bolt could be prepared by suitable cutting off of opposite sides of the dome or rounded head.

Over this rounded or arched portion of the head of the bolt I position a more or less resilient clip F, whose center portion is arched or bent correspondingly to the top curvature of the bolt head with end portions F'' projecting laterally, that is perpendicular to the axis of the curved portion. I preferably form the curvature of this clip F of slightly lesser radius than that of the curved top of the bolt head, and snap a clip in position thereover before inserting these two now assembled parts through the wall aperture at B. This leaves the projecting ends F'' resting against the outer surface of the shell wall at either end of the aperture B, while the bolt head E is now positioned in a sort of cage on the inside of the wall with a threaded stem portion projecting outwardly in perpendicular relation to the plane of the wall. Thereafter the bolt is turned axially in the manner described and the resilient frictional engagement of the curved arch portion of the clip F with the top of the bolt, while not sufficing to halt the described and desired turning of the bolt through a 90° angle does serve to frictionally hold the bolt in its turned relation against being rattled back to position of disengagement from its then interlocking position relatively to the edges of the aperture B. Since, however, if the then wall-engaging neck portion of the bolt were entirely round, the described turning movement might continue beyond the 90° angle desired, I provide, in this form, two angular corners, as D', and two oppositely disposed rounded corners, as D², on the collar D. The rounded corners of course offer no resistance to the turning of the bolt within the aperture, whereas the angular corners D' when the described 90° turn has been accomplished against the aperture edges in such an interlocking manner as to interfere with the further turning of the bolt.

It is under many circumstances entirely effective to form the clip F from a strip of sheet metal which is of uniform breadth throughout its length, but I find it often preferable to form the projecting ends F'' of slightly greater width than the center portion, so that the shoulders F⁴ will form a positive anchorage key or interlock which will prevent their being drawn through the aperture B under any circumstances.

In the modified form of construction illustrated in Figures 6, 7 and 8 the same associative principle as regards the relation of the rectangularly headed bolt J and the shell wall K is employed, but in this case, instead of the initially separate holding clip F used in the construction first described, I retain a large proportion of the metal of the wall accounted for by the creation of the aperture L in the shape of tongues M and N, which remain integrated at their ends with the adjacent metal of the wall, but which are bent inwardly so that their otherwise meeting ends are separated from one another as by the space P. The curvature imparted to these thus inbent tongues corresponds with that of the curved top surface of the bolt J, and yet, as brought out particularly in Figure 6, due to the inclined or angular cut of the spaced end portions of these tongues from one another will operate with equal efficiency as did the separate clip F in the form first described in constituting a cage which prevents the undue inward movement of the bolt head, which latter when inserted in the bay or recess thus constituted may be axially turned with the same correlating effect as between it and the wall as in the form first described. The only variance is thus the negligible presence of a space between the tongue ends over the top central portion of the bolt head, and the fact that there are no outwardly projecting tongue ends similar to the ends F of the type first described.

A further modification of this idea in Figures 9 to 13 inclusive and Figures 14 and 15 are equivalent modifications of the main types above described. The modification in Figures 9 to 13 inclusive embodies a special and more or less arbitrary contouring of the aperture R in the shell wall S, so as to provide the shoulder T, through which aperture a correspondingly contoured bolt head, as U, may be inserted, its shoulder being so positioned as to permit its passage through the aperture R only when placed in registry as regards the shoulders or angular projections upon each. The characteristic of there being two angular corners and two rounded corners on the collar W (which corresponds to the collar D of the first type) remains. An examination of Figure 13, which shows in plan the relation of the bolt head of this contouring to its aperture in the metal wall, after the bolt has been axially turned, will serve to make clear the centering function which the interaction of the shoulders T and V on the shell wall and on the bolt respectively brings about.

Similarly, the further modified form illustrated in Figures 14 and 15 and closely related to the form shown in Figures 6 to 8 inclusive, embodies the provision of a pair of struck up projections, as X, against which the ends of the bolt J' engage when the latter is rotated axially after being positioned through the wall aperture so as to prevent its rotation beyond the approximate 90° angle already remarked upon as desirable. These tongues are of course much smaller than the overengaging bolt holding tongues M' and N', and serve no function as bolt-confining elements, but rather as rotation-limiting members. Correspondingly when this type of construction is resorted to, there are provided depressions, as Y, in opposed relation to each of these small tongues X, to facilitate the turning and head-interlocking movement of the bolt in the proper rotational direction. These depressions are also useful to compensate for possible slight variances in the size of the bolt heads and to facilitate the turning of the latter within their cages or confining clips, whether the rotation-limiting tongues be used or not. An equivalent for these depressions which serve to aid the start of the rotative movement of the bolt head would of course be a slight angular grinding off of the under faces of the bolt head.

In Figure 13 I have illustrated, in sectional elevation, the manner in which a ledge or continuous projection, as Z', on the interior of an ordinary running board structure Z may be made to serve as the element which limits the possible inward movement of the curved top of the bolt head $Z^2$, and to a degree serves, in the same manner as the concaved or arch portion of the clip F of the first described construction, as an element which frictionally opposes the described axial turning of the bolt when inserted through the wall aperture. While such a part would be comparatively rigid, there is generally enough of a play or possible yielding character in the metal wall of the running board to allow for slight irregularities in the size or height of the bolt head so that when this latter is inserted in its aperture and turned the outer or metal wall will bend outwardly sufficiently for the flat under faces of the ends of the bolt head to pass beyond the plane of the inner surface of the metal wall to permit the described turning of the bolt head to interlocking position relatively to the contoured aperture.

What I claim is:

1. Means for effecting the projecting structural integration of a headed bolt with an apertured wall, comprising, in combination with the latter, a bolt member having a threaded stem portion whose projection in position of substantial perpendicularity to the plane of the wall is desired, a head contoured correspondingly to the aperture in the wall, for insertion therethrough followed by an interlocking turn about its own lengthwise axis, and a centrally arched holding clip adapted to have its center portion inserted through the wall aperture before the insertion of the bolt head thereinto, with its end portions in overlapping engagement over external surface portions of the wall adjacent the aperture therein, thereby holding the laterally inserted bolt head against undesired movement through the wall aperture.

2. In combination with a selectively shaped wall aperture, a centrally bent holding clip adapted to be positioned therein, with its end portions overlappingly engaging surface portions of the wall adjacent said aperture, and a bolt member provided with a head of cross-sectional contour corresponding to that of the wall aperture, adapted for insertion through the wall aperture and against the centrally bent portion of the holding clip, relatively to which and to said wall said bolt is subsequently rotated about its axis to effect the interlocking engagement of its head against the remote surface of the wall, the threaded stem portion of the bolt being thus and thereby held in position of substantial perpendicularity to the plane of the wall.

3. In combination with a shell wall provided with an aperture of selective size and contour, a holding clip member adapted to be positioned therethrough as to its central portion, though with its end portions overlapping certain external surface portions of the wall immediately adjacent said aperture, and a bolt member having a threaded stem portion and a head portion of corresponding cross-sectional contour to that of the wall aperture, said head portion being adapted to be inserted therethrough and against the center portion of the previously inserted holding clip, and to be thereafter rotated about the lengthwise axis of the entire bolt as a center, to effect an interlock against the remote surface of the wall, thereby holding the threaded stem portion of the bolt in position of substantial perpendicularity to the plane of the wall.

4. Means for correlating selected structural elements, including a sheet member having a non-circular aperture therein, a bolt having a stem and a head portion conforming in cross sectional contour to and slightly smaller than said aperture, whereby the head may be passed through the aperture and by partial rotation of the bolt, locked behind the sheet, said head also having a portion concentric with the stem, and means projecting from that side of the sheet behind which the head may be so engaged for rotatably supporting said concentric portion of the head.

5. Means for correlating desired structural elements including a sheet member having a non-circular aperture therein, a bolt having a stem and a head portion conforming in cross-sectional contour to and slightly smaller than said aperture, whereby the head may be passed through the aperture and by partial rotation of the bolt, locked behind the sheet, said head also having a portion concentric with the stem, means projecting from that side of the sheet behind which the head may be so engaged for rotatably supporting said concentric portion of the head, and a blocking portion carried by the stem of the bolt and engageable with a part of said non-circular aperture for limiting rotative movement of the bolt to less than 360 degrees and thereby preventing re-alignment of the head with said aperture by continued rotation of the bolt.

6. Means for correlating selected structural elements, including a sheet member having a non-circular aperture therein, a bolt having a stem and a head portion conforming in cross sectional contour to and slightly smaller than said aperture, whereby the head may be passed through the aperture and by partial rotation of the bolt locked behind the sheet, blocking means for limiting the degree of such rotation of the bolt, said head also having a portion concentric with the stem, and means projecting from that side of the sheet behind which the head may be so engaged and rotatably supporting said concentric portion of the head.

WILLIAM R. WILEY.